United States Patent [19]

Mitsuno et al.

[11] Patent Number: 4,686,257

[45] Date of Patent: Aug. 11, 1987

[54] POLYPROPYLENE RESIN COMPOSITION CONTAINING FILLER

[75] Inventors: Tatsuyuki Mitsuno, Chiba; Teruhisa Koyama, Ehime; Hideo Shinonaga; Akio Daimon, both of Chiba, all of Japan

[73] Assignee: Sumitomo Chemical Company, Limited, Osaka, Japan

[21] Appl. No.: 889,533

[22] Filed: Jul. 25, 1986

[30] Foreign Application Priority Data

Jul. 25, 1985 [JP] Japan .................. 60-165584

[51] Int. Cl.$^4$ .......................... C08K 3/00; C08K 3/34; C08L 35/00; C08L 37/00
[52] U.S. Cl. .................... 524/449; 523/214; 524/13; 524/35; 524/423; 524/427; 524/430; 524/451; 524/456; 524/505; 524/517; 525/207
[58] Field of Search ............... 525/207; 524/449, 451, 524/517, 505, 13, 35, 423, 427, 430, 456

[56] References Cited

U.S. PATENT DOCUMENTS 3,849,517 11/1974 Takeshita ..................... 525/207
4,409,286 10/1983 Decroix ....................... 428/215

FOREIGN PATENT DOCUMENTS 759929   5/1971  Belgium ..................... 525/207
0076149  6/1975  Japan .
0127653  6/1981  Japan .
6109213  8/1981  Japan ....................... 525/207
0211303 12/1983  Japan ....................... 525/207

Primary Examiner—Herbert J. Lilling
Attorney, Agent, or Firm—Sughrue, Mion, Zinn, Macpeak, and Seas

[57] ABSTRACT

A filler-containing polypropylene resin composition is disclosed, comprising (a) from 30 to 90% by weight of a polypropylene resin, (b) from 2.5 to 38% by weight of an ethylene copolymer composed of from 82 to 98.7 mol % of ethylene, from 1 to 15 mol % of an ester selected from alkyl acrylate and alkyl methacrylates having from 1 to 8 carbon atoms in the alkyl moiety thereof and from 0.3 to 3 mol % of an unsaturated dicarboxylic acid anhydride, and (c) from 5 to 50% by weight of a filler. Molded products obtained from the composition have improved finishing properties, such as adhesion, coating properties, printability, and the like.

8 Claims, No Drawings

POLYPROPYLENE RESIN COMPOSITION CONTAINING FILLER

FIELD OF THE INVENTION

This invention relates to a polypropylene resin composition containing a filler and, more particularly to a polypropylene resin composition having improved finishing properties, such as adhesion, coating properties, printability, and the like.

BACKGROUND OF THE INVENTION

Polypropylene resins often find difficulty to their non-polarity. It is well known to add fillers to polypropylene resins in order to improve these finishing properties. Taking advantage of excellent mechanical properties and thermal properties of the filler-containing polypropylene resins, their application to automobile parts and appliances have been markedly broadened.

In the application to automobile parts, for instance, interior parts, such as an instrument board, a trim, a pillar-post, etc., are often covered with non-woven fabric, foamed fabric, leather cloth made of polyvinyl chloride, and the like to produce an atmosphere of high-class. Further, there is noted a tendency to coat a bumper in color harmony with the body in a decorative style. In appliance parts, also, printing is commonly employed for decoration.

Thus, incorporation of fillers into polypropylene resins improves finishing properties to some extent depending on the kind and amount of the filler, but such an improvement is still insufficient for practical use.

In order to further improve finishing properties, i.e., compatibility between polypropylene and adhesives or coatings, a medium called as "primer", which typically comprises chlorinated polypropylene and toluene, etc. is usually provided therebetween. However, since the primer itself is expensive and an extra coating step is required, the cost of the final products is so increased. Therefore, further improvements have been demanded.

In an attempt to improve surface properties, physical or chemical etching of the surface of polypropylene molded products prior to finishing has been studied and applied to practice. However, this process involves more complicated steps than the primer coating, and some conditions of etching cause deformation of molded products or produce insufficient effects.

In the case of coating, the process of coating a primer is being shifted to a process comprising oxidatively polarizing the surface of molded articles by irradiation with plasma to improve coating properties. Under the present situation, however, this process does not always achieve satisfactory results because the plasma irradiation should be effected in a batch system and the polarity obtained is non-uniform depending on the shape of the molded articles.

Attempts have also been made to impart polarity to polypropylene *per se*. For example, there have been proposed a process in which polypropylene is modified by grafting with an unsaturated carboxylic acid or an anhydride thereof, e.g., acrylic acid, maleic anhydride, etc., in the presence of an initiator, e.g., organic peroxides; and process in which the above-described grafted polypropylene is blended with unmodified polypropylene, as disclosed in Japanese Patent Application (OPI) No. 76149/75 (the term "OPI" herein used means "unexamined published application"), Japanese Patent Publication No. 10264/77, etc.

According to these processes, the grafting is accompanied by decomposition of polypropylene with the peroxide so that the amount of the unsaturated carboxylic acid or the anhydride thereof to be incorporated is limited. As a result, the surface modifying effect is insufficient. If any effects are produced, mechanical properties are impaired due to degradation of polypropylene to a low molecular weight side.

SUMMARY OF THE INVENTION

An object of this invention is to provide a filler-containing polypropylene resin composition having excellent adhesion, coating properties, printability, and the like.

Another object of this invention is to provide molded products having excellent finishing properties, mechanical characteristics, thermal characteristics and the like from such a filler-containing polypropylene resin composition.

As a result of extensive investigations, it has now been found that the above objects can be accomplished by a composition comprising a polypropylene resin, an ethylene copolymer composed of an ethylene unit, an ester unit selected from alkyl acrylates and alkyl methacrylates and an unsaturated dicarboxylic acid anhydride unit, and a filler.

The present invention relates to a filler-containing polypropylene resin composition comprising:

(a) from 30 to 90% by weight of a polypropylene resin, (b) from 2.5 to 38% by weight of an ethylene copolymer composed of from 82 to 98.7 mol% of an ethylene repeating unit, from 1 to 15 mol% of an ester repeating unit selected from alkyl acrylates and alkyl methacrylates having from 1 to 8 carbon atoms in the alkyl moiety thereof and from 0.3 to 3 mol% of an unsaturated dicarboxylic acid anhydride repeating unit, and (c) from 5 to 50% by weight of a filler.

DETAILED DESCRIPTION OF THE INVENTION

The polypropylene resins which can be used in the present invention include crystalline polypropylene, crystalline propylene-ethylene block or random copolymers, crystalline propylene-$\alpha$-olefin copolymers wherein the $\alpha$-olefin has from 4 to 10 carbon atoms, and mixtures thereof.

The polypropylene resin usually has a melt index (as determined according to JIS K6758) ranging from 0.5 to 100, and preferably from 1 to 50.

Monomers for providing the ester repeating unit in the ethylene copolymer of the invention include methyl acrylate, ethyl acrylate, butyl acrylate, methyl methacrylate, ethyl methacrylate, 2-ethylhexyl methacrylate, butyl methacrylate, etc. (hereinafter referred to unsaturated ester compounds).

The ester repeating unit is present in the ethylene copolymer of the invention in a proportion of from 1 to 15 mol%, and preferably from 3 to 12 mol%. Proportions out of this range deteriorate compatibility of the ethylene copolymer with the polypropylene resin or reduce the effects of improving mechanical characteristics, such as impact strength.

Monomers for providing the unsaturated dicarboxylic acid anhydride repeating unit include maleic anhydride, citraconic anhydride, itaconic anhydride, tetrahydrophthalic anhydride, and the like, with maleic anhydride being particularly preferred.

The proportion of the unsaturated dicarboxylic acid anhydride repeating unit in the ethylene copolymer ranges from 0.3 to 3 mol%, and preferably from 0.5 to 2.8 mol%. With proportions lower than 0.3 mol%, the amount of polar groups which contribute to finishing is too small to produce satisfactory improving effects. Proportions higher than 3 mol% deteriorate compatibility with polypropylene resins due to excessively strong polarity.

Processes for producing the ethylene copolymer are not particularly restricted and include known processes, such as solution polymerization process, emulsion polymerization process, high-pressure bulk polymerization process, and the like processes. Of these processes, the high-pressure polymerization process is the most common, in which ethylene is copolymerized in the presence of a radical generator at a temperature of from 100° to 300° C. under a pressure of from 500 to 3000 atm. in the presence or absence of an appropriate solvent or a chain transfer agent. The high-pressure polymerization process is suitably carried out by dissolving the above-described unsaturated dicarboxylic acid anhydride in the above-described unsaturated ester compound, elevating the solution in pressure by means of a pressure pump, and introducing the solution directly into a vessel type reactor or a tubular reactor. The thus obtained ethylene copolymer has a melt index (as determined according to JIS K6760) of from 0.5 to 300, and preferably from 1 to 200.

If the melt index is smaller than the above-described lower limit, the ethylene copolymer lacks compatibility with the polypropylene resins. Melt indexes higher than the upper limit greatly reduce rigidity, heat resistance or surface hardness of the resulting resin composition.

Fillers to be used in the present invention, either organic or inorganic, are not particularly restricted, and preferably include inorganic fillers, such as calcium carbonate, talc, clay, silica, diatomaceous earth, alumina, zinc white, magnesium oxide, mica, calcium sulfite, calcium sulfate, calcium silicate, glass powders, glass fibers (inclusive of silane-treated glass fibers), asbestos, gypsum fibers, and the like; and organic fillers, such as various kinds of woodmeals, cellulose fibers, melamine powders, and the like.

These fillers may be used either individually or, if desired, in combination thereof. In view of a favorable balance between impact resistance and heat resistance of the resulting filler-containing polypropylene resin composition, talc and/or mica are preferably used as fillers.

The filler-containing polypropylene resin composition according to the present invention contains from 2.5 to 38% by weight, and preferably from 5 to 30% by weight, of the ethylene copolymer (b).

If the proportion of the ethylene copolymer (b) is less than 2.5% by weight, the effects of improviding finishing properties, such as adhesion, coating properties, printability, etc., are insubstantial. On the other hand, if it exceeds 38% by weight, not only any further improving effect is not obtained but also physical properties of the resulting resin composition, such as rigidity, heat resistance, etc., are deteriorated.

The filler-containing polypropylene resin composition of the present invention contains from 5 to 50% by weight, and preferably from 10 to 40% by weight, of the above-described filler (c). If the proportion of the filler (c) is less than 5% by weight, improved thermal characteristics, e.g., a heat deformation temperature, that are essential conditions of the resin composition according to the present invention cannot be ensured. Proportions exceeding 50% by weight seriously reduce impact resistance of the composition, resulting in poor utility as materials for interior and exterior automobile parts. No further effects in improving thermal characteristics are produced by such an excessive filler.

If desired, the filler-containing polypropylene resin composition comprising the above-described components can further contain various styrene-based elastomers, such as a styrene-butadiene random copolymer, a styrene-butadiene block copolymer, hydrogenated products thereof, etc.; various polyolefin elastomers, such as a non-crystalline ethylene-propylene copolymer, an ethylene-propylene-dicyclopentadiene copolymer, etc.; and, in addition, various functional group-containing polyolefins, such as a maleic anhydride-grafted modified polypropylene, a glycidyl group-containing ethylene copolymer, etc.; as long as various characteristics possessed by the resin composition of the invention are not essentially impaired.

Further, it is possible to add to the resin composition of the invention appropriate ammounts of various additives, such as antioxidants, weathering agents, antistatic agents, foaming agents, colorants, and the like.

The method of preparing the filler-containing polypropylene resin composition of the present invention is not particularly restrictd. Kneading machines commonly employed for plastics or rubbers, such as a Banbury mixer, a single-screw extruder, a twin-screw extruder, a roll mill, etc., can be used. The resulting resin composition can be molded into desired molded products by injection molding, extrusion molding, blow molding, etc. in a known manner.

The filler-containing polypropylene resin composition in accordance with the present invention have the following characteristics as well as excellent finishing properties, such as adhesion, coating properties, printability, etc., and excellent mechanical properties:

(1) The resin composition can produce injection molded products having a complicated shape and a small thickness under the conventional molding conditions while substantially retaining flowability inherent to filler-containing polypropylene resins.

(2) The resin composition does not suffer from great reduction in mechanical characteristics, such as rigidity. In particular, the composition has greatly improved impact strength.

(3) Weldlines (a defect of molded products caused by incomplete fusion of two or more flows of molten resins) are not so conspicuous as in the case of using the conventional filler-containing polypropylene resins.

Since the filler-containing polypropylene resin compositions according to the present invention bring about excellent effects as set forth above, they can be utilized in the fields requiring adhesion, coating and printing. Typical examples of their use include exterior parts of automobiles, e.g., a bumper, a bumper corner, etc., interior parts of automobiles, e.g., an instrument board, a meter case, a glove compartment, a console box, a trim, a pillar post, etc., motorcycle parts, e.g., a fender, a leg seal, etc., and appliance parts, e.g., a lid of a washing machine, a body of a vacuum cleaner, a stand of an electric fan, a frame of a ventilating fan, etc.

This invention is illustrated in greater detail with reference to the following examples, but it should be understood that they are not intended to limit the present invention.

EXAMPLES 1 TO 6 AND COMPARATIVE EXAMPLES 1 TO 3

Preparation of Ethylene Copolymer

Ethylene containing a small amount of propane as a chain transfer agent and maleic anhydride were dissolved in an unsaturated ester compound shown in Table 1 below, and the solution was continuously fed under pressure to a 1.2 liter-volume reaction vessel equipped with a stirrer. Copolymerization was effected at a polymerization temperature controlled to 180° C. under a pressure of 1600 kg/cm² at a rate of 1.5 to 3.2 kg/hr to obtain Ethylene Copolymer Samples (a) to (d) as shown in Table 1 below.

TABLE 1

| Sample No. | Comonomer Content (mol %) | | | Melt Index (190° C.) (g/10 min) |
| --- | --- | --- | --- | --- |
| | Maleic Anhydride | Unsaturated Ester Compound | | |
| (a) | 1.22 | butyl acrylate | 5.34 | 150 |
| (b) | 1.10 | 2-ethylhexyl methacrylate | 2.81 | 5 |
| (c) | 2.21 | ethyl acrylate | 7.52 | 41 |
| (d) | 1.95 | methyl methacrylate | 14.4 | 24 |

A polypropylene resin (Sumitomo Noblen ® AW564 produced by Sumitomo Chemical Co., Ltd.), an ethylene copolymer (Sample (a), (b), (c) or (d)) and as a filler (talc having a mean particle diameter (corresponding to a 50% cumulative distribution by the sedimentation-type particle size distribution measurement) of 3.0 μm or mica having a mean particle diameter of 3.5 μm) were blended at a compounding ratio shown in Table 2, and 0.2 part by weight of Irganox ® 1010 (produced by Chiba-Geigy AG), 0.05 part by weight of calcium stearate and 0.05 part by weight of Ultranox ® 626 (produced by Borg-Warner Corp.) per 100 parts by weight of the resin blend were added thereto. The resulting compound was mixed in a dry blender.

The dry blend was melt-kneaded in a vented extruder having a diameter of 65 mm (L/D=28, manufactured by Ikegai Iron Works, Ltd.) at a die temperature of 220° C. to obtain a resin composition in the form of pellets.

Determination of Physical Properties

Physical properties of molded products of the above prepared resin compositions were evaluated in accordance with the following methods:

(1) Wet Tensile Strength:

Measured in accordance with JIS K6768-1977 at 23° C. Specimens under test were prepared by molding the resin composition into a plate of 150 mm×90 mm×2 mm by the use of an in-line screw type injection molding of 3.5 oz. (manufactured by Nissei Jushi Kogyo K.K.).

(2) Adhesive Strength

The same specimen as used in (1) above was coated wih about 150 g/m² of an adhesive comprising 97% by weight of G250 (produced by Cemedine Co., Ltd.) and 3% by weight of Desmodur (produced by Bayer AG) with an air-spray gun, followed by drying at 80° C. for 2 minutes.

A skin material (PPX, produced by Toray Industries, Inc.) was heated at 110° C. for 2 minutes and, immediately thereafter, adhered to the adhesive-coated test plate under a planer pressure of 0.2 kg/cm². After the laminate was allowed to stand at 23° C. and 65±5% RH (relative humidity) for 7 days, peel test was conducted at a peel angle of 180° at a peel rate of 300 mm/min to measure a peel strength.

(3) Initial Adhesion

The same specimen as used in (1) above was cleaned with 1,1,1-trichloroethane vapors (74° C.) for 30 seconds, followed by drying at room temperature. A urethane coat (Flexthane ® #101, produced by Nippon Bee Chemical Co., Ltd.) was directly spray-coated on the plate and then baked in an oven at 120° C. for 30 minutes.

The coating film was cross-hatched with a blade to make 2-millimeter squares (100 squares; 10 by 10). A 24 mm wide adhesive tape (Cellotape ®, produced by Nichiban Co., Ltd.) was adhered thereon by pressing with fingers, and one end thereof was rapidly peeled off. The number of the squares remaining on the plate was counted to determine a percent remaining.

(4) Izot Impact Strength

Measured in accordance with JIS K7110 at 23° C. The specimens were prepared by molding the resin composition by the use of an in-line screw type injection molding machine of 10 oz. (manufactured by Sumitomo Heavy Industries, Ltd.).

(5) Heat Deformation Temperature

Measured in accordance with JIS K7207 at a bending stress of 4.6 kg/cm². The specimens were prepared in the same manner as in (4) above.

The results of these measurements are shown in Table 3.

It can be seen from Table 3 that the molded products obtained from the filler-containing polypropylene resin compositions according to the present invention have an excellent balance of various physical properties as compared with the comparative samples.

TABLE 2

| Example No. | Polypropylene Resin | | Ethylene Copolymer | | Filler | |
| --- | --- | --- | --- | --- | --- | --- |
| | Kind | Amount (wt %) | Kind | Amount (wt %) | Kind | Amount (wt %) |
| Comparative Example 1 | Sumitomo Noblen AW 564 | 70 | — | — | talc | 30 |
| Example 1 | Sumitomo Noblen AW 564 | 50 | (c) | 20 | " | 30 |
| Example 2 | Sumitomo Noblen AW 564 | 50 | (a) | 20 | " | 30 |
| Example 3 | Sumitomo Noblen AW 564 | 50 | (d) | 20 | " | 30 |
| Example 4 | Sumitomo Noblen AW 564 | 50 | (b) | 20 | " | 30 |
| Example 5 | Sumitomo Noblen AW 564 | 50 | (c) | 20 | mica | 30 |
| Example 6 | Sumitomo Noblen AW 564 | 67 | (c) | 3 | talc | 30 |
| Comparative Example 2 | Sumitomo Noblen AW 564 | 30 | (c) | 40 | talc | 30 |
| Comparative Example 3 | Sumitomo Noblen AW 564 | 25 | (c) | 20 | " | 55 |

TABLE 3

| Example No. | Wet Tensile Strength (dyne) | Adhesive Strength (g/25 mm) | Initial Adhesion (%) | Izod Impact Strength (kg-cm/cm) | Heat Deformation Temperature (°C.) |
|---|---|---|---|---|---|
| Comparative Example 1 | 29 | 1,500 | 0 | 4 | 137 |
| Example 1 | 32 | 4,300 | 100 | 7 | 112 |
| Example 2 | 32 | 4,300 | 90 | 7 | 111 |
| Example 3 | 33 | 4,200 | 100 | 7 | 112 |
| Example 4 | 32 | 4,200 | 80 | 8 | 112 |
| Example 5 | 33 | 4,500 | 100 | 5 | 118 |
| Example 6 | 30 | 3,000 | 70 | 5 | 127 |
| Comparative Example 2 | 34 | 4,500 | 100 | 15 | 82 |
| Comparative Example 3 | 33 | 4,300 | 100 | 3 | 112 |

As described above, the present invention provides filler-containing polypropylene resin compositions and molded products thereof exhibiting excellent finishing properties, such as adhesion, coating properties, printability, and the like, as well as high impact strength and high heat resistance.

While the invention has been described in detail and with reference to specific embodiments thereof, it will be apparent to one skilled in the art that various changes and modifications can be made therein without departing from the spirit and scope thereof.

What is claimed is:

1. A filler-containing polypropylene resin composition comprising (a) from 30 to 90% by weight of a polypropylene resin, (b) from 2.5 to 38% by weight of an ethylene copolymer composed of from 82 to 98.7 mol% of ethylene, from 1 to 15 mol% of an ester selected from alkyl acrylates and alkyl methacrylates having from 1 to 8 carbon atoms in the alkyl moiety thereof and from 0.3 to 3 mol% of an unsaturated dicarboxylic acid anhydride, and (c) from 5 to 50% by weight of a filler.

2. A filler-containing polypropylene resin composition as in claim 1, wherein said ester is present in an amount of from 3 to 12 mol% based on the ethylene copolymer (b).

3. A filler-containing polypropylene resin composition as in claim 1, wherein said unsaturated dicarboxylic acid anhydride is maleic anhydride.

4. A filler-containing polypropylene resin composition as in claim 1, wherein said unsaturated dicarboxylic acid anhydride is present in an amount of from 0.5 to 2.8 mol% based on the ethylene copolymer (b).

5. A filler-containing polypropylene resin composition as in claim 1, wherein said ethylene copolymer (b) has a melt index of from 0.5 to 300.

6. A filler-containing polypropylene resin composition as in claim 1, wherein said ethylene copolymer (b) is present in an amount of from 5 to 30% by weight based on the composition.

7. A filler-containing polypropylene resin composition as in claim 1, wherein said filler (c) is talc and/or mica.

8. A filler-containing polypropylene resin composition as in claim 1, wherein said filler (c) is present in an amount of from 10 to 40% by weight based on the composition.

* * * * *